United States Patent [19]

Taleyarkhan

[11] Patent Number: 4,783,308

[45] Date of Patent: Nov. 8, 1988

[54] BOILING WATER REACTOR FUEL ROD

[75] Inventor: Rusi P. Taleyarkhan, Pittsburgh, Pa.

[73] Assignee: Westinghouse Electric Corp., Pittsburgh, Pa.

[21] Appl. No.: 20,159

[22] Filed: Feb. 26, 1987

Related U.S. Application Data

[63] Continuation of Ser. No. 746,818, Jun. 20, 1985, abandoned.

[51] Int. Cl.$^4$ .......................... G21C 3/06; G21C 3/30
[52] U.S. Cl. .................................... 376/370; 376/409; 376/428; 376/457
[58] Field of Search ............... 376/434, 414, 417, 900, 376/901, 370, 409, 428, 457; 420/422

[56] References Cited

U.S. PATENT DOCUMENTS

| | | | |
|---|---|---|---|
| 2,947,678 | 8/1960 | Gimera et al. | 376/901 |
| 3,047,484 | 7/1962 | Stacy et al. | 376/457 |
| 3,145,150 | 8/1964 | Gylfe | 376/457 |
| 3,325,375 | 6/1967 | Mogard | 376/416 |
| 3,376,201 | 4/1968 | Bain | 376/455 |
| 4,678,631 | 7/1987 | Taleyarkhan | 376/444 |

OTHER PUBLICATIONS

"Reactor Handbook", McLain et al., 1964, pp. 363–364.

"Nuclear Reactor Engineering", Glasstone et al., 1981, pp. 348–361, 452–453.

"Gas Cooled Fast Breeder Reactor Designs with Advanced Fuel and Cladding", Nuclear Engr. and Design, Fazzolare, 1/77, pp. 191–201.

Primary Examiner—Deborah L. Kyle
Assistant Examiner—Daniel Wasil

[57] ABSTRACT

An improved nuclear fuel rod includes a plurality of cylindrical nuclear fuel pellets being disposed end-to-end in a stack, and an elongated cylindrical cladding tube providing a hermetically sealed chamber. The cladding tube includes a cylindrical wall having inner and outer spaced surfaces and a thickness "x". The stack of fuel pellets are contained in the chamber and spaced radially inwardly from the wall. The thickness "x" of the cladding tube wall between the inner and outer surfaces is the thickness required to generate sufficient heat internally of the wall between its inner and outer surfaces to satisfy the following relationship of a predetermined total fuel rod radiation intensity output, I, to a predetermined fuel rod radiation intensity generated by the fuel pellets contained in the fuel rod, $I_0: I = I_0 e^{-ux}$, where "u" is the attenuation coefficient which varies with cladding material and radiation type.

8 Claims, 3 Drawing Sheets

BOILING WATER REACTOR FUEL ROD

CROSS REFERENCE TO RELATED APPLICATION

This is a continuation of co-pending application Ser. No. 746,818 filed on June 20, 1985, now abandoned.

Reference is hereby made to the following copending application dealing with related subject matter and assigned to the assignee of the present invention: "Boiling Water Nuclear Reactor Fuel Assembly" by Rusi Taleyarkhan, assigned U.S. Ser. No. 729,602 and filed May 2, 1985 (W.E. 52,509) now U.S. Pat. No. 4,678,631.

BACKGROUND OF THE INVENTION

Field of the Invention

The present invention relates generally to fuel assemblies for a nuclear reactor and, more particularly, is concerned with an improved fuel rod for a boiling water reactor (BWR) fuel assembly which implements criterion for enhanced transient response and system stability.

Description of the Prior Art

Typically, large amounts of energy are released through nuclear fission in a nuclear reactor with the energy being dissipated as heat in the elongated fuel elements or rods of the reactor. The heat is commonly removed by passing a coolant in the heat exchange relation to the fuel rods so that the heat can then be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of self-sustained, nuclear fission reaction. The core is submerged in a flowing liquid, such as light water, that serves as the coolant for removing heat from the fuel rods and a neutron moderator.

A typical fuel rod is composed of an elongated cladding tube having end closures or plugs attached to opposite ends of the tube so as to provide a hermetically sealed chamber in which a plurality of nuclear fuel pellets are disposed end-to-end in a stack. Both the tube and pellets are preferably circular in cross-section and the pellets have a length approximately twice their diameter. The diameter of a pellet is slightly less than that of the tube so that a clearance space or gap is formed therebetween to accommodate any swelling of the pellet during operation of the reactor.

The trend in fuel rod design in all types of nuclear reactors has been to make the thickness of the fuel rod cladding tube as thin as possible for various reasons. For example, in U.S. Pat. No. 3,376,201 to Bain, it is mentioned that the protective sheath (or cladding tube) will, undesirably, absorb neutrons and must be made as thin as possible consistent with the aim of preventing distortion of the fuel element (or rod). With respect to a BWR, such trend overlooks the profound impact that fuel rod design has on nuclear coupled/decoupled thermal hydraulic transients which take place in the reactor. A nuclear coupled transient is one where the thermal hydraulic behavior is coupled to neutronic feedback due to the void reactivity feedback mechanism, whereas, a decoupled transient implies one where this void reactivity feedback is neglected. These transients refer to fuel rod responses to key pertubations, for example, neutron flux/power response to pertubations in the flow rate system pressure, subcooling, etc.

Consequently, a need exists for redirection of attention to gaining a systematic understanding of the effect of fuel rod dynamics on BWR system transient/stability response, with an eye toward modification of the conventional fuel rod design to improve such response.

SUMMARY OF THE INVENTION

The present invention provides an improvement which is designed to satisfy the aforementioned needs. Underlying the present invention is the discovery that through only a minor change in fuel rod design, a profound improvement in BWR performance is achieved. Specifically, what has been uncovered is that making a minor modification in the thickness of the cladding tube to effectuate marginally higher (than what existed heretofore) internal heat generation would result in significantly improved power margins and transient/stability characteristics. Power margin is defined as the amount of bundle power (energy per unit time generated within fuel rods in a bundle) increase/decrease to arrive at the same transient response as for a base case from which a change was made, while transient/stability response merely indicates how a certain (perturbed) parameter will vary as a function of time.

Accordingly, the present invention relates to an improvement set forth in a fuel rod for a nuclear fuel assembly containing fuel therein. The improvement comprises a cladding tube having a wall of a thickness "x" which is the thickness required to generate sufficient heat internally in the wall to satisfy the following (well known Beer's law for radiation attenuation) relationship of a predetermined fuel rod radiation intensity output, I, to a predetermined fuel rod radiation intensity generated by the fuel contained in the fuel rod, $I_0$: $I = I_0 e^{-ux}$; where "u" is the attenuation coefficient which vaires with cladding material and radiation type. The attenuation coefficient "u" determines how much of the incident radiation, $I_0$, will be allowed to "come out" (I); ie., $I_0 - I$ = amount deposited. As is clear from the Cases I–IV presented in the table later on, the attenuation coefficient is a constant for any given material.

More particularly, an improved nuclear fuel rod, comprises (a) a plurality of cylindrical nuclear fuel pellets being disposed end-to-end in a stack; and (b) an elongated cylindrical cladding tube providing a hermetically sealed chamber and having a cylindrical wall of a thickness "x", with the stack of fuel pellets being contained in the chamber and spaced radially inwardly from the wall. The thickness "x" of the cladding tube wall between inner and outer surfaces thereof being the thickness required to generate sufficient heat internally of the wall between its inner and outer surfaces to satisfy the following relationship of a predetermined total fuel rod radiation intensity output, I, to a predetermined fuel rod radiation intensity generated by the fuel pellets contained in the fuel rod, $I_0 : I = I_0 e^{-ux}$.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
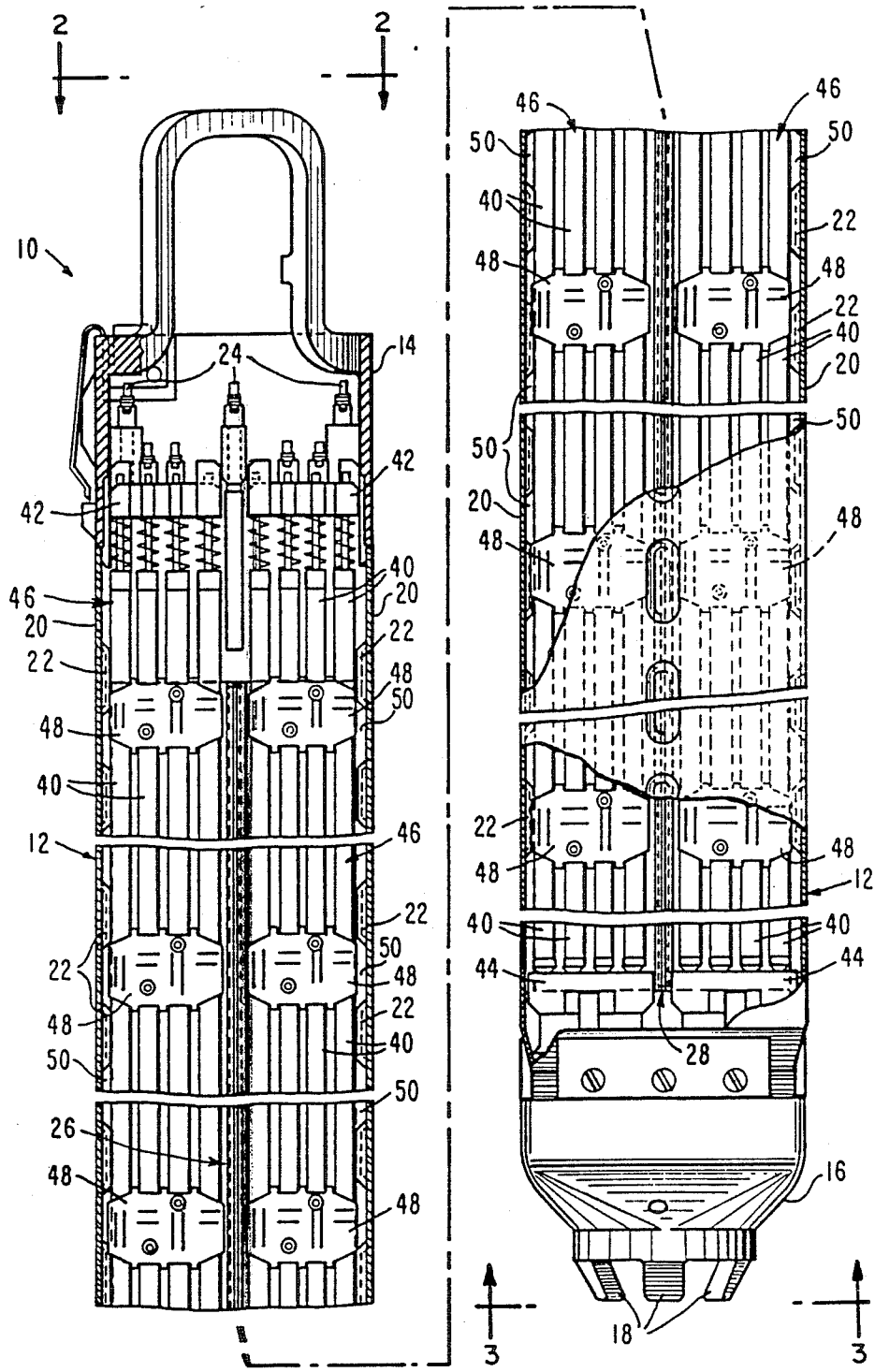
FIG. 1 is an elevational view, with parts broken away and sectioned for clarity, of a BWR assembly in which the improvement of the present invention is employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
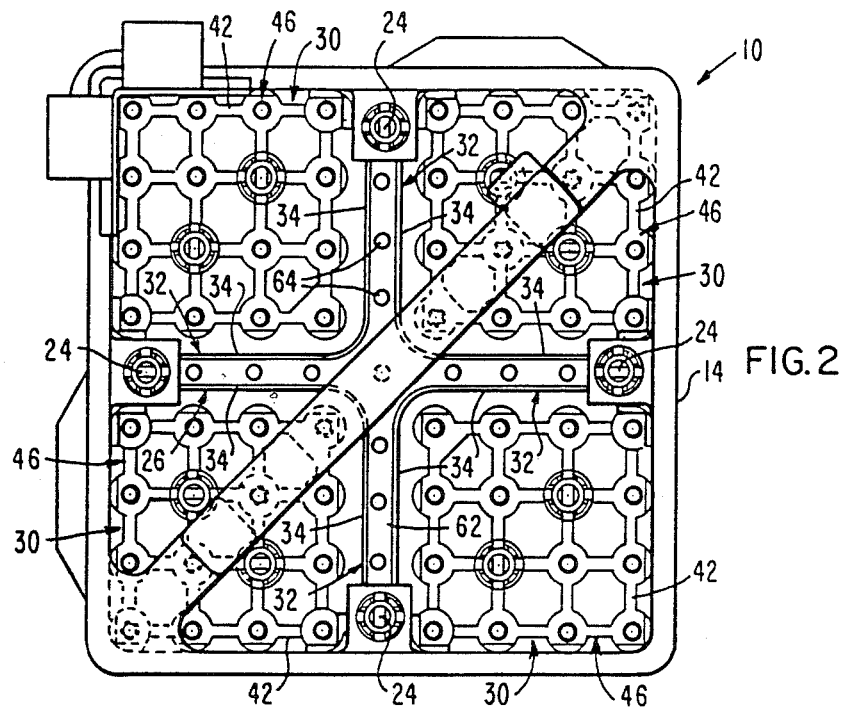
FIG. 2 is an enlarged top plan view of the fuel assembly as seen along line 2—2 of FIG. 1.
Figure 3:
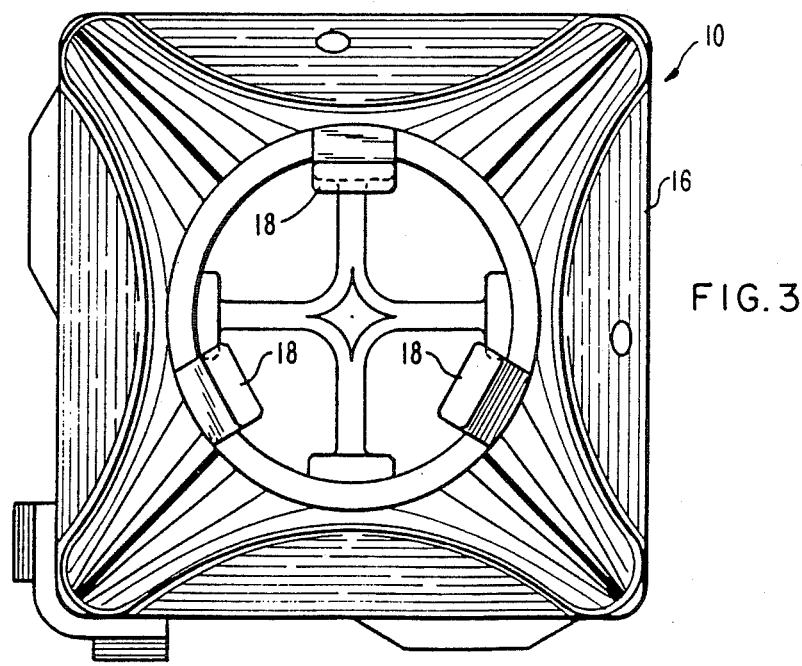
FIG. 3 is an enlarged bottom plan view of the fuel assembly as seen along line 3—3 of FIG. 1.

Referring now to the drawings, and particularly to FIGS. 1 to 3, there is shown a nuclear fuel assembly, generally designated 10, for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in the spaced apart relationship in, and extending in a vertical row at the central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improved neutron moderation and economy, a hollow water cross, generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radical panels 32 composed by a plurality of four, elongated, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimples 36 are formed in and disposed in a vertical column along the axial length of the sheet members 34. Preferably, the dimples 36 in each of the sheet members 34 are laterally and vertically aligned with corresponding dimples 36 in adjacent sheet members 34 in order to provide pairs of opposed dimples that contact each other along the lengths of the sheet members to maintain the facing portions of the members in proper spaced-apart relationship. The pairs of contacting dimples 36 are connected together such as by welding to ensure that the spacing between the sheet members forming the panels 32 of the central water cross 26 is accurately maintained.

The hollow water cross 26 is mounted to the angularly-displaced walls 20 of the outer channel 12. Preferably, the outer, elongated lateral ends of the panels 32 of the water cross 26 are connected such as by welding to the structural ribs 22 along the lengths thereof in order to securely retain the water cross 26 in the desired central position within the fuel assembly 10. Further, the inner ends of the panels together with the outer ends there of define the inner central cruciform channel 28 which extends the axial length of the hollow water cross 26.

Disposed within the channel 12 is a bundle of fuel rods 40 which, in the illustrated embodiment, number sixty-four and form an 8×8 array. The fuel rod bundle is, in turn, separated into mini-bundles thereof by the water cross 26. The fuel rods 40 of each mini-bundle, such being sixteen in number in a 4×4 array, extend in laterally spaced apart relationship between an upper tie plate 42 and a lower tie plate 44 and connected together with the tie plates comprises a separate fuel subassembly 46 within each of the compartments 30 of the channel 12. A plurality of grids 48 axially spaced along the fuel rods 40 of each fuel rod subassembly 46 maintain the fuel rods 40 in their laterally spaced relationships. Coolant flow paths and flow communication are provided between the fuel rod subassemblies 46 in the respective separate compartments 30 of the fuel assembly 10 by a plurality of openings 50 formed between each of the structural ribs 22 along the lengths thereof. Coolant flow through the openings 50 serves to equalize the hydraulic pressure between the four separate compartments 30, thereby minimizing the possibility of thermal hydrodynamic instability between the separate fuel rod subassemblies 46.

The above-described basic components of the BWR fuel assembly 10 are known in the prior art, being disclosed particularly in the above cross-referenced patent application, and have been discussed in sufficient detail herein to enable on skilled in the art to understand the improvement of the present invention presented hereinafter. For a more detailed description of the construction of the BWR fuel assembly, attention is directed to the above-referenced application.

Improved BWR Nuclear Fuel Rod

The improvement of the present invention derives from work undertaken in order to understand fuel rod dynamics, particularly the effect of distributed internal heat generation fluctuation resulting from void reactivity feedback in a BWR. Void reactivity feedback refers to the change in reactivity (i.e. neutron thermalization rate) for a given change in coolant void fraction. That is, for lower void fraction increased neutron thermalization occurs, leading to increased power generated and vice versa. It was found that different fuel rod designs affect BWR system/fuel rod transient/stability characteristics. It should be noted that improved system transient/stability response, especially in BWR's, leads to improved thermal margins, lesser mechanical/structural vibrations and finally improved reactor control.

Before describing the fuel rod design modification comprising the improvement of the present invention herein, an understanding of the basic parameter for evaluating transient/stability response, that being the so-called stability margin, is necessary. Briefly, the greater the value of the stability margin, the better its transient/stability performance. This implies that any modification that increases the value of the stability margin will lead to a faster decay of perturbations (flow, power, etc.) leading to lesser structural vibrations, better thermal/stress related margins and better control.

Figure 4:
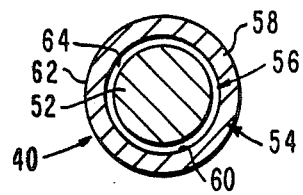
FIG. 4 is an cross-sectioned view of a nuclear fuel rod of the assembly of FIG. 1.

FIG. 4 shows a standard fuel rod design in cross-section. It consists of two concentric elements. The central cylinder is the stack of fuel pellets 52 and the outer ring is the cladding tube 54 of the fuel rod 40. The elongated cylindrical tube 54 provides a hermetically sealed chamber 56 and includes a cylindrical wall 58 having inner and outer surfaces 60,62 spaced by a thickness "x" determined in accordance with the improvement of the present invention, as explained below. The stack of fuel pellets 52, commonly composed of uranium dioxide, are contained in the chamber 56 and spaced radially inwardly from the wall 58 so as to leave a gap 64 therebetween.

Figure 5:
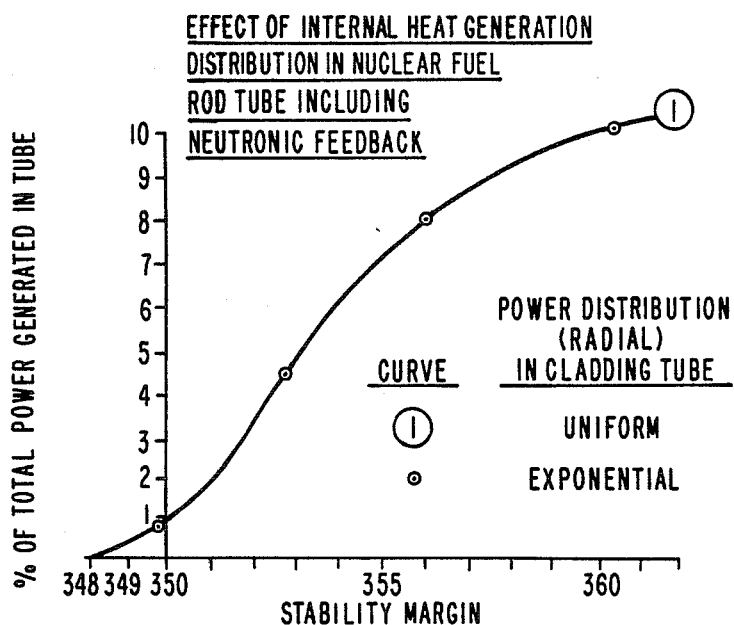
FIG. 5 is a graph of the effect of internal heat generation in the fuel rod cladding tube on the stability margin.
Figure 6:
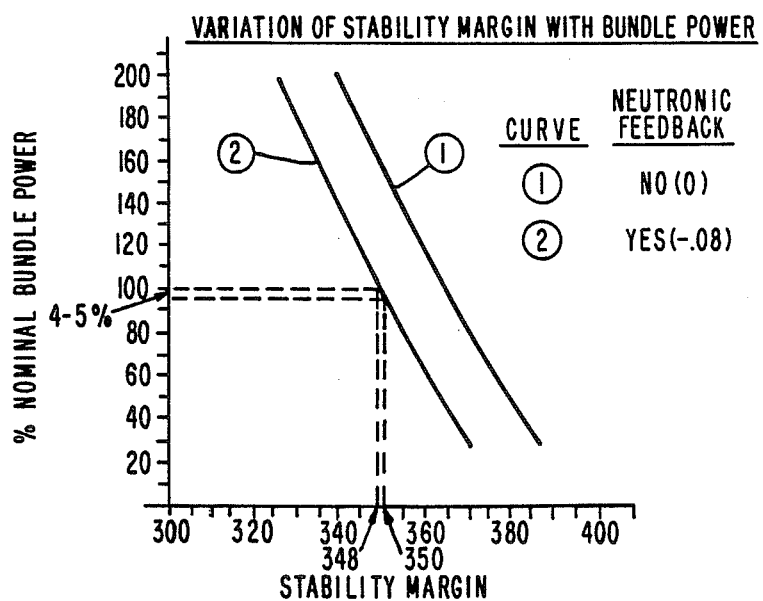
FIG. 6 is a graph of the variation of the stability margin with bundle power.

In work leading to the improvement of the present invention it has been found that for a nuclear coupled stability/transient response, the amount of internal heat generation in the cladding tube wall 58 (which bears proportionally to its thickness, material density, gamma attenuation coefficient, etc.) has a pronounced effect. This is clearly demonstrated from FIGS. 5 and 6. FIG. 5 shows that including internal heat generation in the cladding wall 58 increases the stability margin since the energy content is directly proportional to the radiation intensity. The lesser the value of $I/I_0$, the greater is the amount of energy deposited in the cladding for a given thickness "x". The y-axis in FIG. 5 represents the amount of energy generated/deposited in the cladding. The physical meaning behind this observation is demonstrated in FIG. 6 which shows nominal bundle power (energy per unit time generated within fuel rods within a bundle) as a function of stability margin. The stability margin is the distance from the origin at which the Nyquist locus intersects the real axis, the greater this distance the faster any perturbations will decay. As an example, consider the situation where one percent of the total fuel rod power is deposited/generated in the cladding tube wall. From FIG. 5, this indicates a shift of the stability margin from 348 to 350. Again from FIG. 6, it will be noticed that this shift would correspond to a bundle power margin of approximately four to five percent. That is, the transient response with one percent power deposited in the cladding wall 58 at ninety-five percent power would be approximately the same as that with approximately zero percent power in the cladding wall at one hundred percent bundle power. This is a sizable gain since it is well known that power is a destabilizing parameter.

The improvement in transient response depends on the amount of bundle power deposited in the cladding. This depends on the material attenuation coefficient and its thickness. A study of the actual improvement in system transient response (expressed as % Nominal Power) was conducted. From the four different cases considered, as outlined in the table below, it can be seen that the power margin (% Nominal Power) can vary from about 4.5% to more than 20%.

TABLE

| Case | Clad Material | Clad Thickness (cm) | Attenuation Coefficient | Total Power Deposited % | Change Stability Margin | Power Margin % |
|---|---|---|---|---|---|---|
| I | Zr | $7.366 \times 10^{-2}$ | 0.1689 | 0.8 | 1.8 | 4.5 |
| II | Zr | 0.1413 | 0.1689 | 1.7 | 2.8 | 9.5 |
| III | Fe | $7.366 \times 10^{-2}$ | 0.4677 | 2.2 | 3.3 | 12 |
| IV | U | $7.366 \times 10^{-2}$ | 1.4160 | 6.7 | 6.5 | 22 |

Case I: represents a nominal case for a given Westinghouse QUAD+ bundle design.
Case II: illustrates that an increase in cladding thickness increases attentuation and hence energy deposition. Material of clad is still Zr.
Case III: same as Case I, but material of cladding changed to steel (iron assumed as principal constituent). Due to increased attenuation coefficient, power generation in cladding increases, giving more power margin.
Case IV: represents a situation wherein the cladding material is of very high attenuation coefficient (eg. uranium is dispersed into the clad).

In summary, it can be said that due to exponential (e.g. gamma) attenuation, marginal increments in cladding wall thickness would tend to substantially increase internal heat generation therein. Hence, an increase in wall thickness is suggested. Keeping the same outer diameter of the wall 58, a thickness increase means a lowering of pellet diameter, simultaneously increasing pellet density/enrichment. What the thickness "x" of the cladding tube wall 58 between the inner and outer surfaces 60,62 should be is that thickness required to generate sufficient heat internally of the wall to satisfy the following relationship of a predetermined total fuel rod radiation intensity output, I, to a predetermined fuel rod radiation intensity generated by the fuel pellets 52 contained in the fuel rod, $I_0: I = I_0 e^{-ux}$. Since different power plants are limited differently from transient standpoints, the exact value of "x" cannot be predetermined to give an optimized stability/transient response. However, for specific power margin requirements FIGS. 5 & 6 and the equation $I = I_0 e^{-ux}$ would be used simultaneously. Also from the Cases presented above, it can be said that, in addition to change in thickness of the cladding wall, change in the material composition of the cladding wall such as incorporation of fissionable material into the cladding wall can increase cladding heat generation.

The improved transient response of the type indicated above have several major benefits, since most reactor plants are usually limited by transients. Improved fuel/fluid coupled transient response characteristics would lead to improved CPR margins (i.e., better rod cooling), less fuel loading upon load changes, LOCA benefits, etc.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a boiling water nuclear reactor (BWR) having a plurality of BWR fuel assemblies, each of said fuel assemblies including a plurality of fuel rods, each fuel rod being composed of a cladding tube and a nuclear fuel contained therein, said fuel assemblies defining a given bundle power output with a corresponding power margin and stability margin for said BWR, the improvement which comprises:

said cladding tubes and said nuclear fuel of said BWR fuel assemblies of said BWR each being sources for generating the power output of said BWR, a characteristic of said cladding tubes being preset to define a distribution of total power output of said BWR between said cladding tubes and said nuclear fuel of from 1.7 to 6.7 percent of the total power output to be generated by said cladding tubes and the remainder generated by said nuclear fuel, said distribution of the source of generation of power output permitting an increase in the power margin to take place without a corresponding decrease in the stability margin or an increase in the stability to take place without a corresponding decrease in the power margin thereby providing enhanced transient response and system stability of said BWR.

2. The BWR as recited in claim 1, wherein said cladding tube characteristic is the thickness of the cladding tube.

3. The BWR as recited in claim 1, wherein said cladding tube characteristic is the type of material composing the cladding tube.

4. The BWR as recited in claim 1, wherein said cladding tube characteristic is the inclusion of fissile material in the material composing the cladding tube.

5. In a method of boiling water nuclear reactor (BWR) design wherein said BWR has a plurality of BWR fuel assemblies, each of said fuel assemblies including a plurality of fuel rods, each fuel rod being composed of a cladding tube and a nuclear fuel contained therein, said fuel assemblies defining a given bundle power output with a corresponding power margin and stability margin for said BWR, the method comprising the steps of:

selecting said cladding tubes and said nuclear fuel of said BWR fuel assemblies of said BWR as sources for generating the power output of said BWR; and presetting a characteristic of said cladding tubes to define a distribution of total power output of said BWR between said cladding tubes and said nuclear fuel of from 1.7 to 6.7 percent of the total power output to be generated by said cladding tubes and the remainder generated by said nuclear fuel, said distribution of the source of generation at power output permitting an increase in the power margin to take place without a corresponding decrease in the stability margin or an increase in the stability to take place without a corresponding decrease in the power margin thereby providing enhanced transient response and system stability of said BWR.

6. The BWR as recited in claim 5, wherein said cladding tube characteristic being preset is the thickness of the cladding tube.

7. The BWR as recited in claim 5, wherein said cladding tube characteristic being preset is the type of material composing the cladding tube.

8. The BWR as recited in claim 5, wherein said cladding tube characteristic being preset is the inclusion of fissile material in the material composing the cladding tube.

* * * * *